(12) United States Patent
Amalfitano et al.

(10) Patent No.: US 9,020,796 B2
(45) Date of Patent: Apr. 28, 2015

(54) MODEL BASED VERIFICATION USING INTELLIGENT CONNECTORS

(75) Inventors: Carlo Amalfitano, Melbourne Beach, FL (US); Timothy Stockton, Melbourne Beach, FL (US); Christopher Marot, Indian Harbour, FL (US)

(73) Assignee: Certon Software Inc., Indialantic, FL (US)

( * ) Notice: Subject to any disclaimer, the term of this patent is extended or adjusted under 35 U.S.C. 154(b) by 315 days.

(21) Appl. No.: 13/302,632

(22) Filed: Nov. 22, 2011
(Under 37 CFR 1.47)

(65) Prior Publication Data
US 2012/0191443 A1 Jul. 26, 2012

Related U.S. Application Data

(60) Provisional application No. 61/416,152, filed on Nov. 22, 2010, provisional application No. 61/416,153, filed on Nov. 22, 2010, provisional application No. 61/458,406, filed on Nov. 23, 2010, provisional application No. 61/458,410, filed on Nov. 23, 2010, provisional application No. 61/481,973, filed on May 3, 2011.

(51) Int. Cl.
*G06F 17/50* (2006.01)
*G06F 11/36* (2006.01)

(52) U.S. Cl.
CPC .................................. *G06F 11/3684* (2013.01)

(58) Field of Classification Search
CPC .................................................. G06F 11/3684
USPC ................. 703/6, 13, 14; 700/12, 17; 726/21; 716/108, 133; 370/248; 324/158.11, 324/763; 455/17; 717/109
See application file for complete search history.

(56) References Cited

U.S. PATENT DOCUMENTS

| 5,815,654 | A | 9/1998 | Bieda |
| 6,687,662 | B1 | 2/2004 | McNamara et al. |
| 6,937,965 | B1 | 8/2005 | Bilak et al. |
| 6,965,887 | B2 | 11/2005 | Huelsman et al. |
| 7,003,420 | B2 | 2/2006 | Ur et al. |

(Continued)

OTHER PUBLICATIONS

Elisabeth A. Strunk, M. Anthony Aiello, John C. Knight, EDS, A Survey of Tools for Model Checking and Model Based Development, Technical Report CS-2006-17, Department of Computer Science, University of Virginia, Jun. 2006, 67 pages.

(Continued)

*Primary Examiner* — Kandasamy Thangavelu
(74) *Attorney, Agent, or Firm* — Hamilton, Brook, Smith & Reynolds, P.C.

(57) ABSTRACT

The described embodiments concern verifying operation of a device, where the device may have one or more inputs and/or one or more outputs. At least one input and/or output is associated with an intelligent connector. An intelligent connector is a combination of a signal transport path and a data structure. The signal transport path may be electrical conductors leading to the device or a physical connector associated with the device. The data structure contains the name of a variable transported by the associated physical connector, an address of the variable itself as a value in memory, and further information of a source device that produces the variable, at least in the form of address or pointer to the source device data structure and the addresses of all destination devices that consume the variable.

12 Claims, 2 Drawing Sheets

(56) References Cited

U.S. PATENT DOCUMENTS

| | | | |
|---|---|---|---|
| 7,146,605 B2 | 12/2006 | Beer et al. | |
| 7,203,631 B2 | 4/2007 | Fraer et al. | |
| 7,278,056 B2 | 10/2007 | Hekmatpour | |
| 7,346,486 B2 | 3/2008 | Ivancic et al. | |
| 7,430,548 B2 | 9/2008 | Huelsman et al. | |
| 7,552,102 B2 | 6/2009 | Huelsman et al. | |
| 7,694,276 B2 | 4/2010 | Larus et al. | |
| 7,725,772 B2 | 5/2010 | Proto | |
| 7,734,559 B2 | 6/2010 | Huelsman et al. | |
| 7,757,121 B1 | 7/2010 | Perron et al. | |
| 7,779,382 B2 | 8/2010 | Rehof et al. | |
| 7,793,269 B2 | 9/2010 | Singonahalli et al. | |
| 7,797,687 B2 | 9/2010 | Tillmann et al. | |
| 8,020,137 B2* | 9/2011 | Barrows et al. | 716/133 |
| 8,726,228 B2 | 5/2014 | Ravindran et al. | |
| 2003/0061541 A1 | 3/2003 | Kaler et al. | |
| 2003/0154063 A1* | 8/2003 | Lu et al. | 703/14 |
| 2004/0049371 A1 | 3/2004 | Fraer et al. | |
| 2004/0169591 A1 | 9/2004 | Erkkinen | |
| 2004/0172638 A1 | 9/2004 | Larus et al. | |
| 2005/0096861 A1 | 5/2005 | Ur et al. | |
| 2005/0114838 A1 | 5/2005 | Stobie et al. | |
| 2005/0156589 A1* | 7/2005 | Yamamoto et al. | 324/158.1 |
| 2005/0228630 A1 | 10/2005 | Tseng et al. | |
| 2006/0130010 A1 | 6/2006 | Rehof et al. | |
| 2006/0282807 A1 | 12/2006 | Ivancic et al. | |
| 2009/0077532 A1 | 3/2009 | Denney et al. | |
| 2009/0165125 A1* | 6/2009 | Brown et al. | 726/21 |
| 2009/0199160 A1 | 8/2009 | Vaitheeswaran et al. | |
| 2009/0287958 A1 | 11/2009 | Bhatt et al. | |
| 2010/0004759 A1* | 1/2010 | Scott et al. | 700/12 |
| 2010/0007366 A1* | 1/2010 | Watanabe et al. | 324/763 |
| 2010/0149997 A1* | 6/2010 | Law et al. | 370/248 |
| 2010/0175052 A1 | 7/2010 | Prasad et al. | |
| 2011/0055781 A1* | 3/2011 | Potkonjak | 716/108 |
| 2011/0088012 A1* | 4/2011 | Huin et al. | 717/109 |
| 2011/0159807 A1* | 6/2011 | Kenington | 455/17 |
| 2012/0041570 A1* | 2/2012 | Jones et al. | 700/17 |

OTHER PUBLICATIONS

Jacklin, S.A., Schumann, J.M., Gupta, P.P., Richard, R., Guenther, K., and Soares, F., "Development of Advanced Verification and Validation Procedures and Tools for the Certification of Learning Systems in Aerospace Applications", Proceedings of Infotech@aerospace Conference, Arlington, VA, Sep. 26-29, 2005, 16 pages.

Andrew Allen, Phattanard Phattanarsi, Kenneth A, Loparoas, Fola Soares, ANCT User's Guide, EECS Department of Case Western Research University and Contek Research, Inc, CA., 32 pages, as retrieved from http://web.archive.org/web/2006090114061.

A. Cesta, A. Finzi, S. Fratini, A. Orlandini, E. Tronci, Flexible Timeline-Based Plan Verification, K1 2009: Advances in Artificial Intelligence Lecture Notes in Computer Science vol. 5803, 2009, pp. 49-56.

Fola Soares, Phattanard Phattanasri and Kenneth A. Loparo, Verification and Validation of Complex Adaptive Systems, EECS Department of Case Western Reserve University and Contek Research, Inc., Apr. 2005, 26 pages.

Authors Unknown, Chapter 2 (Part 2) MATLAB Basics, 2009, 10 pages, as retrieved from http://web.njitedu/-hung/cs1 01/chap02b.pdf on Nov. 13, 2014.

Authors Unknown, Ulcontrol: slider panel, Matlab Central, 2007, 1 page, as retrieved from http:1/blogs.mathworks.com/pick/2007/02/23/uicontrol-slider-panel/ on Nov. 13, 2014.

\* cited by examiner

MODEL BASED VERIFICATION USING INTELLIGENT CONNECTORS

RELATED APPLICATION(S)

This application claims the benefit of U.S. Provisional Application No. 61/416,152, filed on Nov. 22, 2010, U.S. Provisional Application No. 61/416,153, filed on Nov. 22, 2010, U.S. Provisional Application No. 61/458,406, filed on Nov. 23, 2010, U.S. Provisional Application No. 61/458,410, filed on Nov. 23, 2010 and U.S. Provisional Application No. 61/481,973, filed on May 3, 2011. The entire contents of the above referenced applications are hereby incorporated by reference.

TECHNICAL FIELD

This application relates to automation of Test Case generation for Model-Based verification of safety-critical software.

PROBLEMS WITH THE EXISTING ART

Safety-Critical Software can be described by model based requirements, herein referred to as diagrams. These diagrams are pictorial representations of components, or devices, each with a deterministic behavior and design that are interconnected and verifiable. The method of verification involves development of a set of test vectors referred to as Test Cases. Test cases can contain information such as initial conditions, timing, inputs, and expected results which provide for complete coverage of the functional behavior and design of diagrams that can be stitched together to form an embodiment of the safety-critical software. There have been several attempts to perfect verification using control-flow criteria. Control-flow criteria are used to test decisions and conditions in a program.

A Test Case based on an exhaustive test set for which all possible inputs permutations are exercised is unfeasible even for relatively small projects using extremely powerful computational resources. For this reason, verification testing has been limited to Modified Condition/Decision Coverage (MC/DC), or other similar methods. While MC/DC reduces the number of test cases needed to perform verification from roughly $2^n$ to n+1, where n is the number of conditions in a program, the reduction is insufficient for diagrams more complex than a few Boolean gates.

The state of the art of software verification currently requires the production of a parallel and independent model of the software to be verified, such as safety-critical software. Methods currently used for the verification of components include the generation of Test Cases through the application of random input signals, and the removal of the component under test.

In the application of random input signals to generate test cases example method, each component can have a built-in intelligence to determine if the input signals presented to it are sufficient for testing the component itself. For example, the gate under test can have built-in intelligence to determine if the required MC/DC combinations have been presented to it. With such built-in intelligence, the meaningful signals can then be extracted from initial set of signals and recorded. The information that a specific component has been tested, or not tested, is useful.

In the removal of the component under test verification method, input signals can likewise be generated in a random manner. If the output produced changes when the component under test is removed it can be concluded that the input test signal has reached the component, and that the output of the component reaches the output boundary of the Black Box. In other words, the output has been promoted to a Real World output.

The above methodologies, sometimes in combination and cooperation with other similar methodologies are effective but difficult and expensive, since they require a large amount of intelligent user guidance. The difficulty and cost of verification increase exponentially with the size of the project to be verified. While the verification of a handful of diagrams containing mostly Boolean components is quite simple and inexpensive the verification of a 200-diagram project currently has a multi-million-dollar price tag, much of which is due to the cost of manpower. While the cost of coding the signal processing diagrams from specification drawings is directly proportioned to the number and complexity of diagrams, the cost of verification of the diagrams is exponential.

SUMMARY OF AN EMBODIMENT

A technique for verifying operation of a device under verification, where the device may have one or more inputs and one or more outputs, with at least one input and/or output associated with an intelligent connector. The intelligent connector is a data structure that contains the name of a variable transported by that connector, an address of the variable itself as a value in memory, and further information of the device producing the variable, at least in the form of address or pointer to the device data structure and the addresses of all other devices consuming that variable.

In one embodiment, input signals suitable to verify a component or device may be represented by "intelligent points" as described in the above-referenced U.S. Provisional Patent Application No. 61/416,153. The signals (and the Intelligent Points necessary to generate the signals) may vary depending upon the scope 25 of the verification and with accepted practices. It is possible to program a device to recognize when the verification has completely taken place. Events trigger the device to settle to a new state, and when the final state is reached, the device must have been completely verified by the sequence of events—according to agreed upon and accepted criteria for complete verification of the device. It is possible, in a preferred embodiment, to create a "reverse function" for each device. This is not in mathematical terms but related to the capability to "demote" an Intelligent Point (that is to move it towards the input side of a black box description).

It is thus possible to create a programming data feature that enables modifying an Intelligent Point required for verification across devices, rapidly and directly. We refer to this data feature as an "Intelligent Connector". Each input and output for the device under test is made to point (as an address or pointer) to such an Intelligent Connector, which is a data structure that contains the name of the variable (humanly readable, i.e. in ASCII) transported by that connector, the address of the variable itself (value in memory) as well as the information of the device producing the variable (in the form of address or pointer to the device data structure) and the addresses of all the devices "consuming" that variable.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION AN EMBODIMENT

Figure 1:
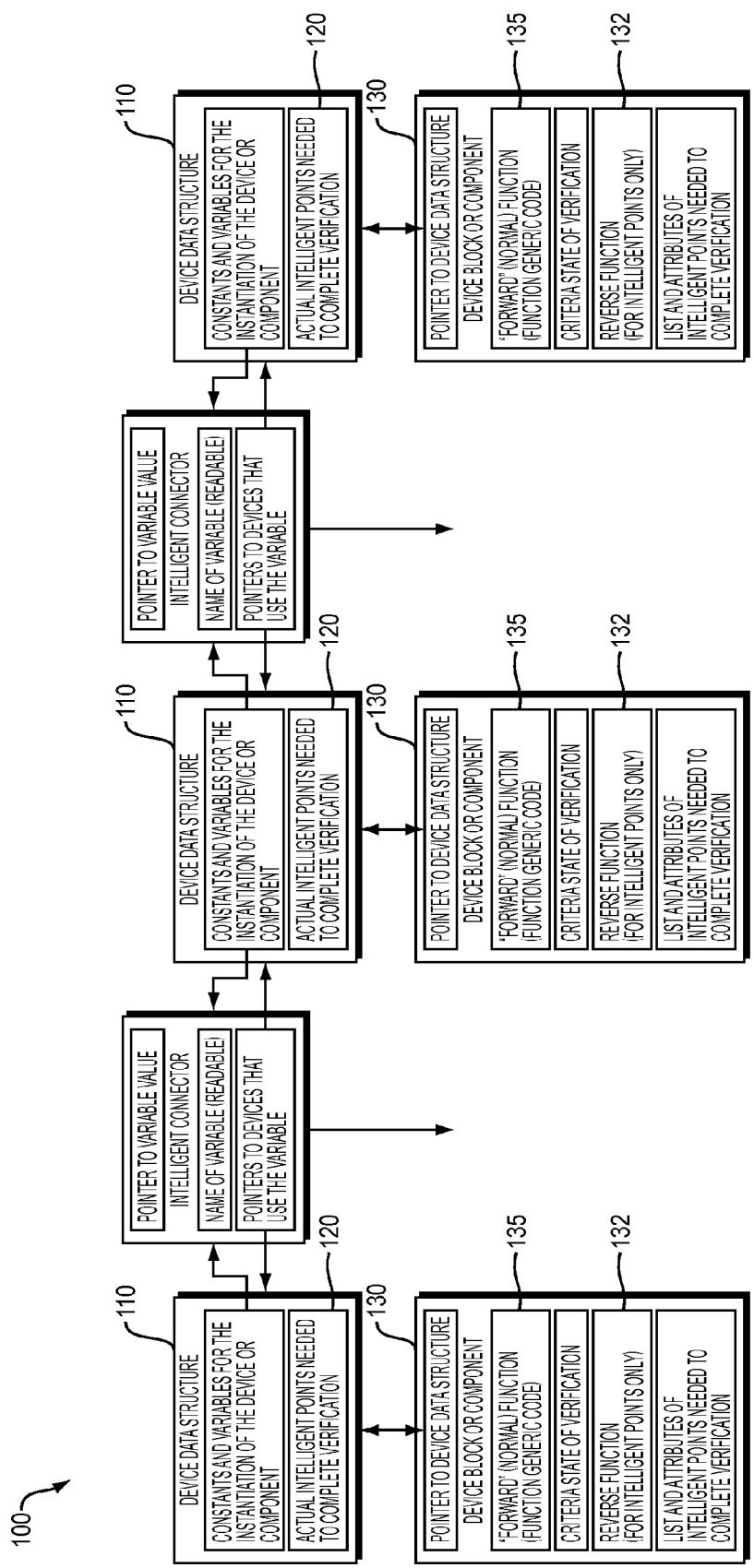
FIG. 1 illustrates the use of Intelligent Point and Intelligent Connectors to automatically generate Test Cases and Test Procedures for verification of a Black Box or diagrams within a black Box.

Due to the exponential relationship between the cost of verification and the number and complexity of diagnosis to be verified, it is useful to devise a method to produce verification Test Cases and Test Procedures that vary linearly with the complexity of the project, in order to reduce cost.

The disclosed example embodiment can be applied to verify the signal processing of any safety-critical software such as a Flight Code program with hundreds of diagrams. Each diagram can have multiple inputs, outputs and components. For example, each diagram can have 10 inputs, 3 outputs, and 20 components and be verified using current computing power.

An example embodiment provides a solution for automated test generation for verification of safety-critical software in any fields such as, aviation, medical, transportation. Such systems can have thousands of input variables hundreds of output variables, of assorted types such as, Integer, Boolean, and Analog, with a variety of types and precisions.

The list of components can include Boolean gates, timers, counters, window counters, filters, trigonometric functions, table look-ups, multi-dimensional table interpolators, voters, summers, limiters, and many non-linear exceptions.

The MC/DC solution is dwarfed by the reality of the verification needs in a complex project. Further the MC/DC verifies only the independent effect of each input condition on the outcome of the decision, and does not verify a Boolean gate. For example, a two input OR gate that is incorrectly implemented as a two input XOR gate will pass all test cases for complete MC/DC coverage the test set of two {FF=F, FT=T, TF=T} However, it will fail the remaining test case for input combination of TT, which results in T for OR and F for XOR. The verification of the OR gate is not complete and correct in this example.

It is typically assumed that the state of the art of verification requires that the system be verified using signals at Black Box level. In other words that only Real World input signals to the Black Box and Real World output signals from the Black Box be used. These Black Box level signals allow for verification of the software because it will execute in its operational environment with interconnected components processing inputs under normal and robustness conditions.

In the past, some systems required only the verification that each component inside the box is the desired component. The assurance that the correct components are inside the box, and even that some groups are correctly connected, proves very little about the functionality of a complex Black Box as a whole. There are safety-critical requirements errors and deficiencies, as well as code errors that can be identified only through a rigorous verification approach that involves "end to end" testing of a stitched system which controls the Real World Inputs and monitors the Real World Outputs.

Other attempts to simplify the verification problem have tried a system engineering methods. If the permutations of all possible inputs are too many, the systems engineering method reduces numbers of inputs. For example, analog variables are reduced to reasonable intervals, or Boolean exhaustive testing is reduced to MC/DC. The individual diagrams are then manually studied and inputs signals are added to verify components yet to be tested within the individual diagram.

It is possible to describe input signals suitable to verify a component, or device, in a simple form using the "Intelligent points" described in the above-referenced U.S. Provisional Patent Application No. 61/458,410.

The signals, and the points necessary to generate them, may vary depending upon the scope of the verification and with accepted practices. Using "Intelligent Points" (IntelliPoints) so that the verification program does not have to deal with a "signal" of arbitrary duration in time, but only with a few time-value points and attributes, such as if the signal will hold the value to the next point or if it will be linearly interpolated to the next point, can be useful.

It is possible to program a device to recognize when the verification has completely taken place. In an example, we provide a state-event diagram for a Delay-On timer. Events trigger the device to settle to a new state, and when the final state is reached, the device must have been completely verified by the sequence of events—according to agreed upon and accepted criteria for complete verification of the device.

It is possible to create a "reverse function" for each device. A reverse function of the device is the capability to "demote" an Intelligent Point that is to move it towards the input side of the Black Box. For example, assuming a two-input AND gate is feeding a 2 second Delay ON timer, with the output of this timer feeding a device to be verified, and a TRUE (and hold) value at 10 seconds among other points, is needed to verify the device, To verify the example, the Intelligent Point (10', TRUE) can be demoted to the input side of the Delay ON timer. Intelligent Point [8", TRUE] applied to the input of the timer implements the desired signal—[8", TRUE] delayed two seconds becomes [10", TRUE]. All signals are assumed FALSE at initialization for simplicity. The reverse function of the Delay ON timer is then to subtract the delay from the Intelligent Point and to add the hold attribute. The demotion of the Intelligent Point [8", TRUE] to the input side of the AND gate only requires two Intelligent Points, having the same values, one for each input of the AND gate. The two points with the same value [8", TRUE] for the two variables input to the AND gate generate a [10", TRUE] input value to the device under verification.

It is possible to create an "Intelligent Connector" programming data feature that enables modification of an Intelligent Point required for verification across devices, rapidly and directly. Each device under test can have one or more inputs and one or more outputs. Each input and output can be made to point to as an address or pointer to an Intelligent Connector. An Intelligent Connector is a data structure that contains the name of the variable in a humanly readable format such as ASCII transported by that connector, the address of the variable itself or value in memory information about the device producing the variable in the form of address or pointer to the device data structure and the addresses of all the devices consuming that variable.

An example embodied method to verify a Delay Timer in the middle of a diagram, in the middle of a Black Box, can be comprised of several steps. First, established that, for example, four Intelligent Points can satisfy the verification of the Timer, for Persistency and Expiration tests. Second, the Intelligent Points are generated as a function of an arbitrary start time, such as T1.

Next, the Intelligent Connector can be accessed at the input of the Timer and its connection can be determined.

Finally, reverse-function for the device at the other end of the connector can be created to demote the four Intelligent Points to the input of the device. This may generate more Intelligent Points, but the process can be repeated for each one until Real World Inputs, Intelligent Connectors with no producer associated own all the Intelligent Points.

In most cases it can be assumed that the Intelligent Points, will generate the conditions required to verify the device under test such as the Timer. Unfortunately, this is not true in all cases. Simply demoted Intelligent Points may not consider feedback loops or other special reverse functions, such as, devices generating pulses, or a combination of inputs that mask the intended results to the output.

To overcome this shortcoming, the reverse function for a device must provide a feature to select from a variety of possibilities and test them one by one. For example, a TRUE is needed as an output of an OR gate, and can be generated with Intelligent Points 10 that set one, some, or all the inputs to the gate to TRUE. It is then useful for the system to select the simplest case and proceed with demotion until Real World inputs are reached, but also maintain a placeholder for each non-unique reverse function. The system can then compute the normal forward function to verify that there is an observable effect on a Real World output and the desired verification is satisfied. If not, 15 another combination of demoted Intelligent Points can be tried.

A similar example embodiment is disclosed for promoting a signal to the output. Assuming that the signal is now a real signal with one value per frame, and not a collection of Intelligent Points, the Intelligent Connector data structure can be used to navigate downstream to the Real World output. When the signal encounters a device, for most devices, the device has the information on how to promote that input signal with no change, or with changes that still represent the original signal. This signal transfer is a meaningful transfer function, in which the output signal must represent unequivocally the input signal, where any variation of the input has unmasked effects on the output.

For example, if a Boolean signal encounters an OR gate, that gate may request that all other inputs have a FALSE and HOLD Intelligent Point for the duration under consideration. Therefore, when the signal that needs to be promoted toggles, the changes are directly visible on the output of the gate. If the signal to be promoted reaches a timer, then the timer transfers the signal to the output with a delay, as long as the changes of state are slower than the timer delay. This is enabled by informing the device under test that the Intelligent Points required can be spread apart on a time line according to the need of the downstream timer.

Analog variables have similar considerations. An analog variable encountering a multiplier requires no action, the output has the same shape of the input and is representative of the input, as long as the other inputs are constant and non-zero. If the analog variable to be promoted encounters a limiter, the maximum of the input variable must be less than the maximum value of the limiter. To verify the limiter, an example embodied method returns to the preceding device, and request it to reduce or scale down the value of the verification Intelligent Points used to create the signal.

The Intelligent Connectors make the process deterministic instead of combinatorial. In other words, the system knows immediately and directly where to connect and proceed, albeit through several possible branches. The process is never a blind combinatorial or random exercise. An example embodiment is made up of informed and intelligent choices "do loops." An example embodiment can be an analytical programming automation of the process performed manually when an engineer moves the Intelligent Points.

An engineer may be able to generate Intelligent Points to verify one component in one hour. An example embodied method can generate the same Intelligent Points in one minute or less of processing time.

In some cases it is not possible to produce complete verification of all components within a system with Real World inputs and outputs. In other cases an example embodiment may fall short of the intelligence required to achieve the target verification completeness. Even in these cases, the Intelligent Connectors are useful because even if it is possible to produce an automated verification of only 90% of the components, the human time saved is very significant. Also, a list of the exceptions is spelled out by the program, in a "to do list" for manual verification.

Another useful feature of an example embodied method is that the process can learn. Every time a path, via Intelligent Connectors, successfully demotes or promotes Intelligent Points, the relative cost, expressed in number of tries and number of devices traversed in order to promote or demote the variable to Real World variable, is associated with it. (By tracking these relative cost associations, the program can start with low-cost paths first.) When new requirement mandate new verification be performed or a second pass is required to auto-generate the Test Cases.

An example embodiment of the present disclosure enables the use of algorithms that are suitable for automated generation of Test Cases and Test Procedures for most devices contained within a "Black Box". The example embodied method can begin with a user performing a number of initial steps, such as the following:

1) Listing all devices types in the project
2) Coding a simple, efficient and streamlined primitive function for each device type. Such a function is the normal or simple forward function applied to signals input to the device, and not to the Intelligent Points. In other words, this is the function used when a set of input vectors traverses the Black Box and generates the output results, and is what is done in any Model-based verification.
3) Adding to the code for each device type a few IF conditions, or branches, that increase device functionality, such as self-determination functionality, i.e., whether if it has been successfully verified or needs to start the process of Test Case creation in order to verify itself.
4) Listing and determining for each device type, or negotiating with the verification authority, the number and type of Intelligent Points required for the complete and successful verification of that device type, for example.
5) Determining the Intelligent Point "reverse Function," for each device type, which is the reverse function for the device. The reverse function is how the device moves Intelligent Point upstream, from the right side or output side toward the input side. In most cases, the reverse function can result in a transformation of an Intelligent Point into one or more Intelligent Points with different characteristics.
6) Determining the Intelligent Points "forward promotion function" for each device type, which is the best method to carry a signal through the device with no change, minimal change, or change linearly proportional to the input signal. This forward transform may require the creation of a few Intelligent Points to enable the promotion function.
7) Coding an automated method for each device type, which determines if the device is verified completely by the signals passing through it.
8) Listing and adding all the visual information for all devices required to debug them, to add data structures appropriately, and to initialize them all.

The complexity of the initial steps varies linearly with the number of devices and device types. The complexity of the tasks depends more on the device types, which may be similar for medium and large projects. The initialization steps may be reusable among several projects.

FIG. 1 illustrates an example embodiment, for each device 110 there are small "packages" of Intelligent Points 120 that can be carried across the connectors. The packages are transformed at each station or device block 130, by the rules of the respective reverse 132 and forward 135 functions of the device. In other words, the Intelligent Points are changed or proliferated by the demotion or promotion rules for that device.

The reverse 132 and forward 135 functions of a device can be programmed using common programming methods including recursion. In an example embodied method uses an algorithm, for each device that needs verification, beginning with the Intelligent Points required for verification, then continue moving each Intelligent Point 120 to the left or demoting, until it is an Input signal. After all the Intelligent Points 120 required for verification have been demoted to Real World input signals, i.e., Black Box inputs, they can pave the way to the output. The signals can be promoted until a meaningful transfer function is visible as a Real World output signal, i.e. a Black Box output. The creation of other intelligent Points 120 at the devices 110 being traversed may be required to allow the signals to go through with minimum change. Such newly created points also need to be demoted to Real World input signals. The described algorithm is fast, given the nature of the connectors. The Intelligent Connectors can transfer the Intelligent Points information with few machine instructions.

Figure 2:
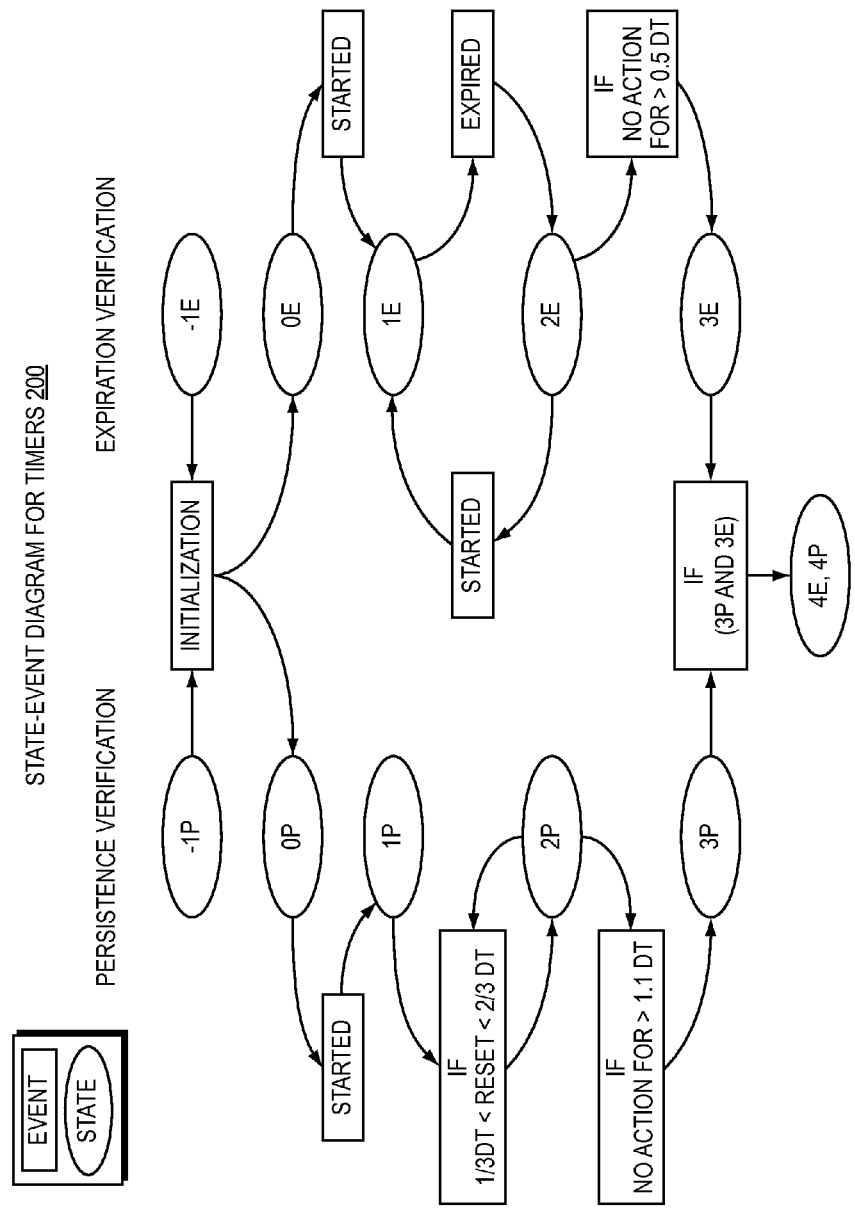
FIG. 2 is a state diagram for timer verification.

FIG. 2 illustrates an agreement between a certification authority and a verification engineer on how to test a Timer (Delay ON). The diagram of FIG. 2 can be reduced to four or five Intelligent Points IPs depending on the initial conditions, assuming:

Dt to be the expiration time constant,
T0 the start time of the verification process,
Then, the Intelligent Points would be:
Input to FALSE before Time T0 (say T0−Dt*1.2)
Input to TRUE at time T0
Input to FALSE at time T0+Dt/2
Input to TRUE at Time T0+Dt/2+Dt*1.2
No other signal changes (input to TRUE at time T0+Dt/2+Dt*1.2+Dt*1.6).

The state diagram 200 exemplifies how each Intelligent Point can be carried as a request through the connectors to the upstream devices, where each request is transformed according to the device, and then demoted to Real World signals, step by step. Each step is fast, and even many trial-and-error steps should result in an extremely fast generation of test procedures, especially considering algorithms that remember successful paths, such as by storing in a connector an optimized path. A preferred example embodiment allows a method program to spend some time exploring an optimized path, or a path that requires all nominal inputs plus the minimum number of non-nominal Real World inputs, to attain the required value from an Intelligent Point as a device input. A preferred example embodiment can also be applied to the promotion to Real World outputs. The program can try to find the largest number, up to a limit, of variables that successfully represent the signals required to verify a device. This process makes the "transfer function" more robust, since it is represented by more than one variable.

An example embodiment of this disclosure uses an algorithm that instead of starting from Black Box input signals to attempt to verify a component inside the box, starts from the component itself and works its way to the Black Box inputs and outputs. This is made easier by the Intelligent Points, which carry the signal-related information. Although example embodiments have been illustrated in signal processing environments, other embodiments are valid in other environments. The concept of Intelligent Connector is novel for the information stored and transferred by the connector. The concept of Intelligent Connector enables the above described algorithm.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for verifying operation of a device under verification, comprising:
   a signal transport path configured to couple a signal to one or more inputs, or from one or more outputs, of the device under verification;
   a processing platform configured to support a data structure, the processing platform further configured to combine the signal transport path and a data structure to form an intelligent connector;
   the intelligent connector being capable of at least one of (i) demoting a signal form within the device toward an input side of the device and (ii) promoting the signal form within the device toward an output side of the device.

2. The apparatus of claim 1, wherein the data structure include information corresponding to one or more connected devices in addition to the device under verification, the one or more connected devices and the device under verification being associated with the signal transport path.

3. The apparatus of claim 2, wherein the information corresponding to the one or more connected devices includes at least one of pointers and addresses.

4. The apparatus of claim 1, wherein the data structure contains at least one of (i) a name of a variable transported by the associated signal transport path, (ii) an address of the variable itself as a value in memory, and (iii) further information of a source device that produces the variable.

5. The apparatus of claim 4, wherein the further information of the source device is in the form of an address or a pointer to the source device data structure and the addresses of all destination devices that consume the variable.

6. The apparatus of claim 1, wherein the signal form is one or more Intelligent points.

7. The apparatus of claim 1, wherein demoting a signal form includes considering effects of other devices between the signal form and the input side of the device under verification.

8. The apparatus of claim 1, wherein promoting a signal form includes considering effects of other devices between the signal form and the output side of the device under verification.

9. The apparatus of claim 1, wherein the signal transport path includes at least one of an electrical conductor and (ii) a physical connector.

10. A method of verifying operation of a device under verification, comprising:
    identifying, by a processor, a signal transport path configured to couple a signal to one or more inputs, or from one or more outputs, of the device under verification;
    combining, by a processor, a data structure with the signal transport path to form an intelligent connector;

moving through the intelligent connector, a signal form within the device under verification toward an external boundary of the device under verification.

11. The method of claim 10, wherein moving the signal form includes demoting the signal form within the device toward an input boundary of the device.

12. The method of claim 10, wherein moving the signal form includes promoting the signal form within the device toward an output boundary of the device.

* * * * *